United States Patent
Distler et al.

(10) Patent No.: US 11,833,981 B2
(45) Date of Patent: Dec. 5, 2023

(54) SUPPORT ELEMENT FOR FASTENING AN INTERIOR LINING PART TO A COMPONENT OF A VEHICLE, FASTENING ARRANGEMENT AND VEHICLE

(71) Applicant: Bayerische Motoren Werke Aktiengesellschaft, Munich (DE)

(72) Inventors: Harald Distler, Garching (DE); Sascha Engel, Petersberg (DE); Ralf Mueller, Neuburg/Donau (DE); Andreas Petermann, Huenfeld (DE); Wolfgang Witek, Ilmmuenster (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/047,543

(22) PCT Filed: Feb. 6, 2019

(86) PCT No.: PCT/EP2019/052863
§ 371 (c)(1),
(2) Date: Oct. 14, 2020

(87) PCT Pub. No.: WO2019/201489
PCT Pub. Date: Oct. 24, 2019

(65) Prior Publication Data
US 2021/0146857 A1    May 20, 2021

(30) Foreign Application Priority Data
Apr. 17, 2018   (DE) .................... 10 2018 205 809.1

(51) Int. Cl.
*B60R 13/02* (2006.01)
*B60R 21/04* (2006.01)

(52) U.S. Cl.
CPC .......... *B60R 13/0206* (2013.01); *B60R 13/02* (2013.01); *B60R 21/04* (2013.01); *B60R 21/0428* (2013.01)

(58) Field of Classification Search
CPC ... B60R 13/013; B60R 13/02; B60R 13/0206; B60R 21/04; B60R 2021/0414; B60R 2021/065; B60J 5/04; B60J 5/0469
(Continued)

(56) References Cited

U.S. PATENT DOCUMENTS 5,531,499 A * 7/1996 Vecchio ............. B60R 21/0428
24/297
5,660,426 A * 8/1997 Sugimori ............ B60R 13/0206
267/140

(Continued)

FOREIGN PATENT DOCUMENTS

CN    102245436 A    11/2011
DE    199 63 810 B4   11/2005
(Continued)

OTHER PUBLICATIONS

Kraus et al., "Center Console For Motor Vehicle", Aug. 4, 2011, German Patent Office, Edition: DE102010001447A1 (Year: 2011).*
(Continued)

*Primary Examiner* — Amy R Weisberg
*Assistant Examiner* — Joyce Eileen Hill
(74) *Attorney, Agent, or Firm* — Crowell & Moring LLP

(57) ABSTRACT

A support element fastens an interior lining part to a structural part of a vehicle, wherein the interior lining part is fastenable to the structural part via the support element. The support element has at least one deformation region which is of meandering design in at least one plane and is deformable under the application of a force.

13 Claims, 3 Drawing Sheets

(58) Field of Classification Search
USPC ....... 296/1.07, 39.1, 146.4, 146.6, 152, 153, 296/187.12
See application file for complete search history.

(56) References Cited

U.S. PATENT DOCUMENTS

| | | | |
|---|---|---|---|
| 5,725,271 A * | 3/1998 | Patel | B60R 13/025 296/187.05 |
| 7,198,319 B2 * | 4/2007 | Schroder | B60J 5/0416 296/146.7 |
| 9,738,322 B2 * | 8/2017 | Matthiessen | B62D 25/02 |
| 2007/0075531 A1 | 4/2007 | Tsuge | |
| 2010/0096901 A1 | 4/2010 | Benkler et al. | |
| 2011/0302765 A1 | 12/2011 | Marx et al. | |

FOREIGN PATENT DOCUMENTS

| | | | | |
|---|---|---|---|---|
| DE | 10 2004 023 396 A1 | 12/2005 | | |
| DE | 10 2005 018 833 A1 | 1/2006 | | |
| DE | 10 2005 021 165 A1 | 11/2006 | | |
| DE | 10 2008 039 962 A1 | 3/2010 | | |
| DE | 10 2008 053 602 A1 | 4/2010 | | |
| DE | 10 2010 001 447 A1 | 8/2011 | | |
| DE | 102018203546 A1 * | 9/2019 | ............ | B60R 13/02 |
| EP | 0 794 107 A1 | 9/1997 | | |

OTHER PUBLICATIONS

Kaya, "Fixing Device for a Headlining", Published Sep. 12, 2019, Publisher: German Patent Office, Edition: DE 102018203546 A1 (Year: 2019).*

International Search Report (PCT/ISA/210) issued in PCT Application No. PCT/EP2019/052863 dated Mar. 26, 2019 with English translation (five pages).

German-language Written Opinion (PCT/ISA/237) issued in PCT Application No. PCT/EP2019/052863 dated Mar. 26, 2019 (five pages).

German-language Search Report issued in German Application No. 10 2018 205 809.1 dated Dec. 3, 2018 with partial English translation (12 pages).

English-translation of Chinese Office Action issued in Chinese Application No. 201980026224.0 dated Mar. 2, 2023 (six (6) pages).

* cited by examiner

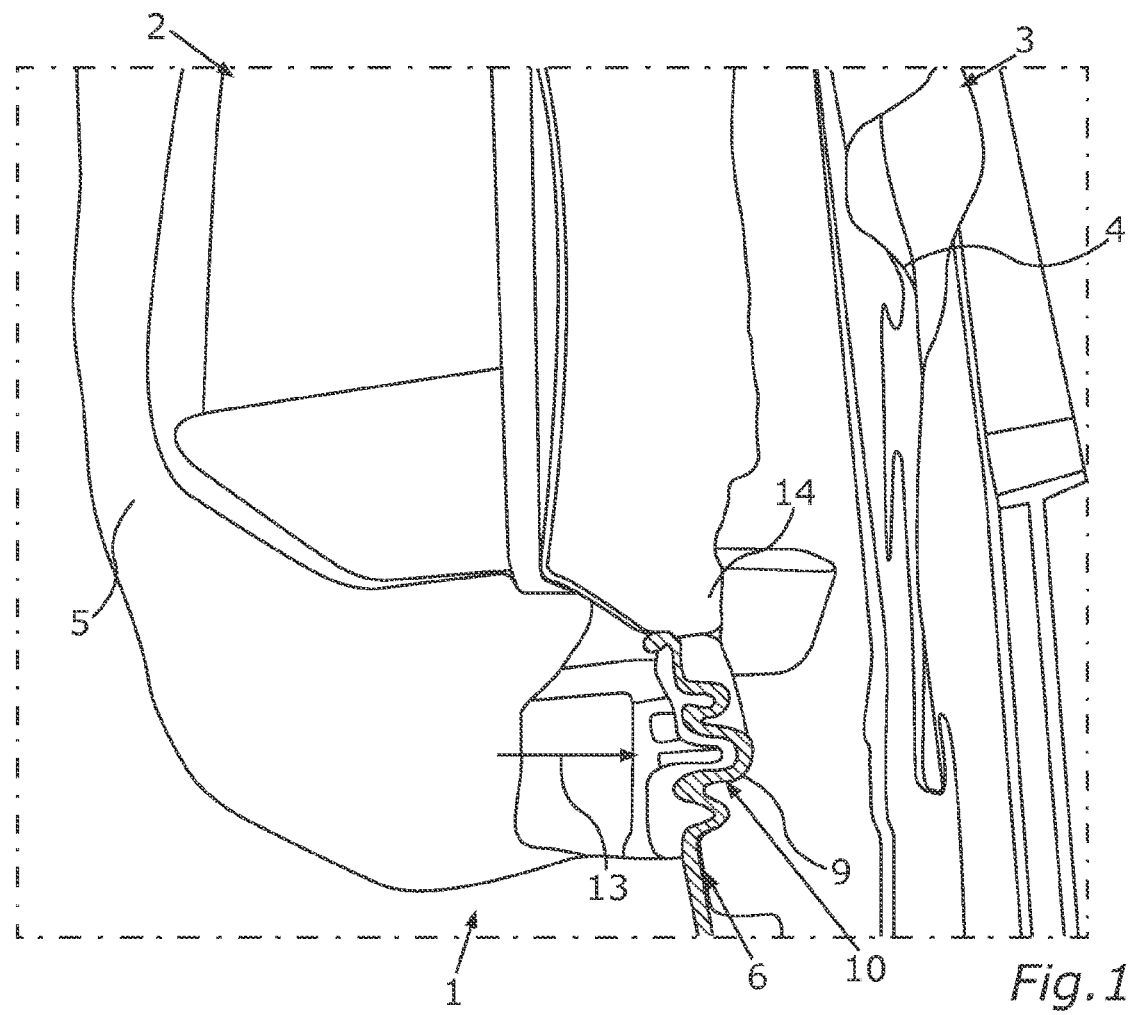
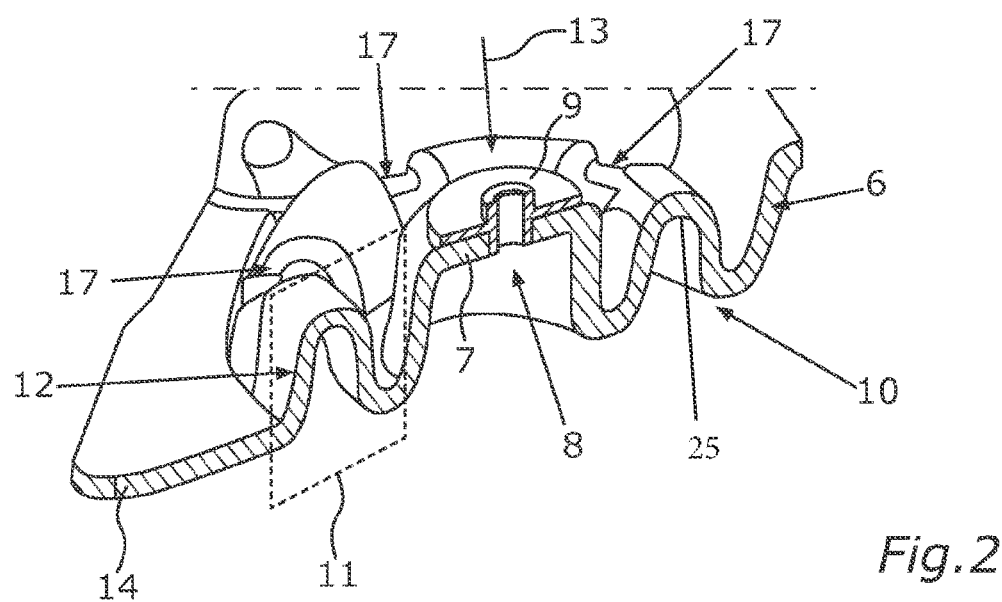

US 11,833,981 B2

SUPPORT ELEMENT FOR FASTENING AN INTERIOR LINING PART TO A COMPONENT OF A VEHICLE, FASTENING ARRANGEMENT AND VEHICLE

BACKGROUND AND SUMMARY OF THE INVENTION

The invention relates to a support element for fastening an interior lining part to a structural part of a vehicle. Furthermore, the invention relates to a fastening arrangement for fastening an interior lining part to a structural part of a vehicle, in particular a motor vehicle. In addition, the invention relates to a vehicle.

Such a support element for fastening an interior lining part to a structural part of a vehicle, in particular a motor vehicle, and such a fastening arrangement for fastening an interior lining part to a structural part of a vehicle, are already known from DE 10 2004 023 396 A1, for example. In the fastening arrangement, the interior lining part is fastened to the structural part via a support element. Here, the support element can have at least one fastening region in or by means of which the interior lining part can be or is fastened to the support element. For this purpose, the fastening region comprises for example at least one fastening element by means of which the interior lining part can be or is fastened to the fastening region and thus to the support element at least indirectly, in particular directly.

Moreover, DE 10 2008 039 962 A1 discloses a vehicle door having a door frame and having a lining for the door frame, wherein the lining is arranged on a side facing the vehicle passenger compartment. DE 10 2005 018 833 A1 discloses a device for fastening a lining part to a structural part of a motor vehicle. In addition, US 2007/0075531 A1 discloses an interior lining part for a vehicle.

Interior lining parts of vehicles, in the completely produced state of the vehicles, are arranged in their passenger compartments and can therefore play an important role in realizing an advantageous accident behavior of the vehicles.

It is therefore the object of the present invention to further develop a support element, a fastening arrangement and a vehicle of the type stated at the outset in such a way that a particularly advantageous accident behavior can be realized in a particularly cost-effective manner.

This object is achieved according to the invention by a support element, by a fastening arrangement and by a vehicle, in accordance with the claimed invention.

A first aspect of the invention relates to a support element for fastening an interior lining part to a structural part of a vehicle, in particular a motor vehicle formed for example as a car and preferably here as a passenger car. Here, the interior lining part can be fastened to the structural part via the support element.

The support element can have for example at least one fastening region in or by means of which the interior lining part, which can be or is fastened to the structural part via the support element, can be or is fastened to the support element. For this purpose, the fastening region comprises for example at least one fastening element by means of which the interior lining part is or can be fastened to the fastening region and thus to the support element at least indirectly, in particular directly. The fastening element is for example a latching element, in particular an opening formed for example as a through-opening, wherein the interior lining part, by means of the fastening element, can for example be fastened to the fastening region or to the support element in a form-fitting and/or force-fitting manner. In particular, it is conceivable that the interior lining part can be fastened to the support element by means of the fastening element in a reversible and thus nondestructively releasable manner. The fastening region is provided in particular when the interior lining part and the support element are formed as structural parts formed separately from one another. Alternatively, it is conceivable that the interior lining part and the support element are formed in one piece with one another, with the result that the support element is a constituent part or a part of the interior lining part.

In order then to be able to realize a particularly advantageous accident behavior of the support element and consequently of the interior lining part and of the vehicle as a whole in a particularly cost-effective manner, there is provision according to the invention that the support element has at least one deformation region. Thus, the interior lining part can be or is fastened to the structural part via the deformation region. A force which acts for example in the event of an accident from the structural part to the interior lining part via the support element thus runs from the structural part to the interior lining part via the deformation region and, where appropriate, via the possibly provided fastening region. If the fastening region is provided, the deformation region adjoins the fastening region, for example.

Here, the deformation region is formed in a meandering shape in at least one imaginary or virtual plane. In other words, the deformation region has, at least in the aforementioned plane, a meandering extent or a meandering profile and thus successive or adjoining meandering loops, which are also referred to as meandering twists, which are formed in one piece with one another for example. Particularly as a result of the meandering configuration of the deformation region, the latter is deformable, in particular plastically, under the application of a force which runs for example at least in the plane and possibly results from an accident, in particular under absorption of accident energy. In other words, since the deformation region is configured according to the invention in a meandering shape at least in the plane, the deformation region can be particularly advantageously deformed and thereby take up a particularly large amount of energy, in particular accident energy, convert it into deformation energy and thus absorb it, if for example in the event of an accident an accident-induced force, in particular at least in the aforementioned plane, acts on the deformation region or via the structural part on the support element and possibly via the support element on the interior lining part. It is additionally possible for other structural elements to be relieved of load and thus protected from excess loading.

The meandering configuration of the deformation region allows the installation space requirement for the support element in its nondeformed state to be kept particularly low. In the context of the accident-induced deformation of the deformation region there is for example a change in a respective curvature of the meandering loops, with the curvature for example becoming larger or even being canceled. In the case of a correspondingly high accident energy which acts as a result of the accident on the deformation region or on the support element and which results from a correspondingly high accident-induced application of force, it is possible for the deformation region to be deformed, in particular at least in the plane, for example in such a way that the meandering loops are as it were pulled apart. The deformation region configured with a meandering shape before the accident-induced application of force thus has for example, after its accident-induced deformation, no longer a meandering shape, but wall regions which for example, before the accident-induced application of force, form or have formed the meandering shape or the meandering loops, run for example, after the accident-induced deformation, along a line or rectilinearly in succession and thus no longer form meandering loops.

This advantageous deformation or deformability of the deformation region makes it possible for example to avoid undesired forms of damage such as cracks, breaks, tears or the like, with the result that a particularly advantageous accident behavior can be realized.

The support element according to the invention is particularly advantageously suitable for fastening a door interior lining or an interior lining part of a door interior lining of a side door, with the result that there is preferably provision that the aforementioned interior lining part is a door interior lining part and thus a part of a door interior lining. For example, the interior lining part is an armrest. The structural part is thus a structural part of the side door. For example, the structural part can be a part of the door interior lining, therefore a further interior lining part. In particular, the structural part is for example a bodyshell part, in particular a door bodyshell part, with the result that the structural part can be a constituent part of a bodyshell of a side door. The invention is here particularly based on the finding that a deformation at least of a side door of the motor vehicle can occur in the event of an accident of a motor vehicle. Such a deformation of the side door occurs in particular in the event of a side impact in which accident-induced loads act at least substantially in the vehicle transverse direction from outside to inside on the side door and thus for example on the structural part and from this on the support element and possibly via the support element on the door interior lining. This means that deformations of the door interior lining can result from the deformation of the side door. It is customary for the door interior lining to be fastened to the door bodyshell of the side door, also referred to as bodyshell door, in particular by screwing and/or by latching or clipping. In order to realize a particularly advantageous accident behavior for persons residing in the passenger compartment of the vehicle, the door interior lining should, during deformation thereof, neither splinter nor expose sharp edges or lead to parts flying around loosely in the passenger compartment. Above a certain deflection of the side door and thus also of the door interior lining fastened to or in a door frame, there can necessarily occur cracks and thus splinters on or in the door interior lining. In addition, the door interior lining is customarily composed of different parts, that is to say interior lining parts, between which gaps can open as a result of the deformation. It is therefore possible for sharp edges situated therebetween to be exposed.

One possibility of avoiding excessively large deformations that lead to the fracture of the door interior lining and to the exposure of sharp edges is for example for the connection between the door bodyshell, in particular the door frame, and the door interior lining to be designed to yield under loading and deformation. Thus, the door interior lining can be released from the door frame to a certain degree, which necessarily leads to less deflection of the door interior lining. As a result, undesired fracture and exposure of free edges can be prevented. Alternatively or additionally, the possibility can be implemented within the door interior lining per se, for example to keep the deflection of the armrest low, for example by virtue of the fact that it is released from its support, for example the support element according to the invention, in a targeted manner.

Solutions known from the prior art by means of which undesired deformations and/or undesired movements of interior lining parts, in particular of door interior linings, are intended to be avoided lead to increased outlay in manufacture, since these solutions add further steps to the production of the door interior lining. In particular the use of an arrester strap as an additional component, by means of which for example undesired intrusions of the door interior lining into the passenger compartment or an uncontrolled moving around of the door interior lining are or is intended to be avoided, is associated with significant costs. Here, however, the arrester strap performs only a holding function such that, although the door interior lining is deflected less, it still has to take up a large part of the energy. In other words, the arrester strap allows only a relatively large path over which the door interior lining can move, but a high amount of energy must still be taken up by the door interior lining.

The aforementioned problems and disadvantages can be avoided by means of the support element according to the invention, since the support element per se and thus the vehicle overall can be produced in a simple and cost-effective manner. In particular, the support element according to the invention avoids the use of additional auxiliary structural parts which are intensive in terms of installation space, weight and cost. In addition, the support element, in particular its deformation region, itself acts as an energy absorption element which, in the event of an accident, in particular in the event of a side impact, is deformed under energy absorption. As a result, the interior lining part itself does not have to take up and absorb accident energy, or only a small amount, with the result that undesired, excessive deformations and fractures, cracks and the exposure of sharp edges can be avoided. In the course of the accident-induced application of force acting for example on the structural part and here in the direction of the interior lining part, the support element and thus the deformation region are arranged between the structural part and the interior lining part. Thus, the deformation region is deformed, with the result that it can take up and absorb at least part of the accident-induced application of force or the accident energy and consequently keep it away from the interior lining part formed for example as a door interior lining part. As a result, an excessive, accident-induced loading of the interior lining part can be avoided.

A further advantage is that the support element according to the invention, in particular the deformation region, can be produced in a particularly simple and cost-effective manner. For example, the support element or the deformation region can be demolded in a simple manner from a mold for producing the support element or the deformation element, since the support element or the deformation region does not have an undercut.

In order to be able to realize a particularly advantageous deformation behavior and thus accident behavior, there is provision in an advantageous embodiment of the invention that the plane in which the deformation region is formed with a meandering shape runs parallel to a fastening direction which is formed as a straight line and in which the interior lining part can be or is fastened to the structural part and/or to the fastening region, or the straight line or fastening direction formed as a straight line runs in the plane. In other words, within the context of fastening the interior lining part to the support element and thus to the structural part, the interior lining part is fastened to the structural part and/or to the fastening region and thus to the support element along the or in the fastening direction. For this purpose, for example the interior lining part is moved in the fastening direction relative to the structural part and/or relative to the support element and thereby moved into contact or into supporting abutment with the structural part or with the support element, in particular with the fastening region. Since the fastening direction then runs preferably parallel to or in the plane, the deformation region can be particularly advantageously deformed and in so doing take up and absorb a particularly large amount of accident energy, with the result that excessive loading and thus resulting, excessive deformations of the interior lining part can be avoided. The above-described meandering loops overlap or cover one another at least partially, in particular at least predominantly or completely, for example along a direction running in the plane and thus perpendicularly to the fastening direction. A particularly high energy absorption capacity of the deformation region can be realized as a result.

A further embodiment is distinguished by the fact that, in the installed position of the support element, in particular starting from the fastening region, the deformation region runs in a meandering shape in the vehicle longitudinal direction and/or in the vehicle vertical direction. Alternatively, the deformation region runs, in particular starting from the fastening region, in a meandering shape in the vehicle transverse direction and/or in the vehicle vertical direction. The meandering deformation region has for example at least one or precisely one meandering loop or a plurality of meandering loops. Here, the respective meandering loop is for example bulged or curved in the vehicle longitudinal direction and/or in the vehicle vertical direction, or the respective meandering loop is for example bulged or curved in the vehicle transverse direction and/or in the vehicle vertical direction. If, for example, a plurality of meandering loops are provided, the meandering loops adjoin one another in the vehicle longitudinal direction and/or in the vehicle vertical direction, or the meandering loops adjoin one another in the vehicle transverse direction and/or in the vehicle vertical direction. Here, the support element assumes its installed position in the completely produced state of the vehicle, with, in the completely produced state of the vehicle, the interior lining part being held on the structural part via the support element. If the structural part is for example a bodyshell part, in particular a door bodyshell part and thus a constituent part of a door bodyshell of a side door, it is thus the case that, in the completely produced state of the vehicle, the side door is held so as to be movable, in particular pivotable, on a superstructure of the vehicle that is preferably formed as a self-supporting body. Here, the support element, structural part and interior lining part assume their respective installed position when the side door is closed. If the deformation region runs in the vehicle longitudinal direction and/or in the vehicle vertical direction in the installed position, it is possible in particular in the event of a side impact for excessive loading and deformations of the interior lining part or of the door interior lining to be avoided. In the installed position of the support element, the fastening direction thus runs preferably obliquely or perpendicularly to the vehicle vertical direction and here preferably obliquely or parallel to the vehicle transverse direction.

In order to realize a particularly advantageous accident behavior, there is provision in a further embodiment of the invention that the deformation region has at least one through-opening, in particular at least one through-opening formed as a slot, along its circumferential direction, which runs about an imaginary or virtual axis which runs parallel to or in the plane. As a result, the deformation behavior of the support element and thus its energy absorption capacity can be set in a targeted manner.

A further embodiment is distinguished by the fact that the deformation region, in particular its meandering loops, has or have at least two camberings and/or curvatures which differ from one another. As a result, the deformation behavior of the support element can be set in a targeted manner and thus so as to suit the requirement.

In a further embodiment of the invention, the deformation region, in particular its meandering loops, has/have at least two wall thicknesses which are different from one another. As a result, a particularly advantageous accident behavior and energy absorption capacity can be set.

In a particularly advantageous embodiment of the invention, the deformation region is formed in one piece with the fastening region, with the result that an advantageous accident behavior can be implemented in a manner which is advantageous in terms of installation space and cost-effective.

Finally, it has been shown to be particularly advantageous if at least the deformation region, in particular the support element, is formed from a plastic. As a result, a particularly high amount of accident energy can be absorbed by means of the support element in a cost-effective manner.

A second aspect of the invention relates to a fastening arrangement for fastening an interior lining part to a structural part of a vehicle, in which the interior lining part is fastened to a structural part by way of at least one support element at least indirectly, in particular directly. For example, the support element can be directly fastened to the structural part, or the support element is fastened to the structural part indirectly and thus for example via at least one further structural element, with the result that the interior lining part is fastened to or held on the structural part via the support element and via the at least one further structural element. The structural element can for example be a further interior lining part which for its part can be held on or fastened to the structural part at least indirectly, in particular directly, to the structural part formed for example as a bodyshell part, in particular as a door bodyshell part. The support element can be formed in one piece with the interior lining part. Furthermore, it is conceivable that the interior lining part and the support element are components which are formed separately from one another and are connected to one another. Here, for example, the support element has a fastening region in or by means of which the interior lining part is fastened to the support element.

In order then to be able to realize a particularly advantageous accident behavior, there is provision according to the invention that the support element has a deformation region which for example adjoins the fastening region and which is formed in a meandering shape in at least one plane and is deformable under the application of a force which for example runs at least in the plane and/or results from an accident, in particular under absorption of accident energy. Advantages and advantageous embodiments of the first aspect of the invention are to be considered as advantages and advantageous embodiments of the second aspect of the invention, and vice versa.

In principle, it is conceivable that the support element is a constituent part of the structural part or a constituent part of a bodyshell, in particular a door bodyshell, comprising the structural part. However, it has been shown to be particularly advantageous if the support element is formed as a component which is formed separately from the structural part and which is fastened to the structural part. Furthermore, the support element is for example formed separately from the interior lining part and is connected to the interior lining part. Furthermore, the support element and the interior lining part can be formed in one piece with one another. In particular, it is possible that the support element and the interior lining part are constituent parts of an interior lining, in particular a door interior lining. Here, the door interior lining is formed separately from the structural part and thus from the aforementioned bodyshell and is fastened to the bodyshell. Consequently, the support element is for example a part of the interior lining, wherein the interior lining part can be a further part of the interior lining. The interior lining part is for example an armrest of the interior lining, wherein the armrest is connected to the support of the interior lining and thus for example fastened to the structural part or to the bodyshell via the interior lining or by way of the support.

The interior lining part is for example connected to the support element in its fastening region and thus fastened to the support element by screwing and/or latching or clipping and/or by welding. A third aspect of the invention relates to a vehicle, in particular a motor vehicle, wherein the vehicle has at least one support element according to the invention and/or at least one fastening arrangement according to the invention. Advantages and advantageous embodiments of the first aspect of the invention and of the second aspect of the invention are to be considered as advantages and advantageous embodiments of the third aspect of the invention, and vice versa.

Details of the invention will become apparent below with reference to the description of the figures and to the drawings.

BRIEF DESCRIPTION OF THE DRAWINGS

FIG. 1 shows, in the form of a detail, a schematic and sectioned perspective view of a fastening arrangement for fastening an interior lining part formed as an armrest to a structural part of a side door for a vehicle, in which the interior lining part is fastened to the structural part via at least one support element according to a first embodiment.

FIG. 2 shows, in the form of a detail, a schematic and sectioned perspective view of the support element according to the first embodiment.

In the figures, identical or functionally identical elements are provided with the same reference signs.

DETAILED DESCRIPTION OF THE DRAWINGS

FIG. 1 is a schematic and sectioned perspective detail view showing a fastening arrangement 1 for fastening an interior lining formed as a door interior lining 2 to a bodyshell 3, also referred to as a door bodyshell, of a door for a vehicle. The door is a side door, with the vehicle being formed as a motor vehicle and here in particular as a passenger car. In the completely produced state of the vehicle, the latter has a superstructure which is formed as a self-supporting body and which has at least one lateral door opening. The door opening makes it possible for example for persons to get into and to get out of the passenger compartment of the vehicle. Here, the door formed as a side door is assigned to the door opening and, in the completely produced state of the vehicle, is held on the superstructure so as to be movable, in particular pivotable. In the completely produced state of the vehicle, the side door and thus the bodyshell 3 and the door interior lining 2 of the side door can be moved, in particular pivoted, relative to the superstructure between a closed position and at least one open position. In the closed position, the side door closes at least one subregion of the corresponding door opening. In the open position, the side door frees the subregion. The side door and thus the bodyshell 3 and the door interior lining 2 assume their respective installed position in the completely produced state of the vehicle and in the closed position of the side door.

Figure 3:
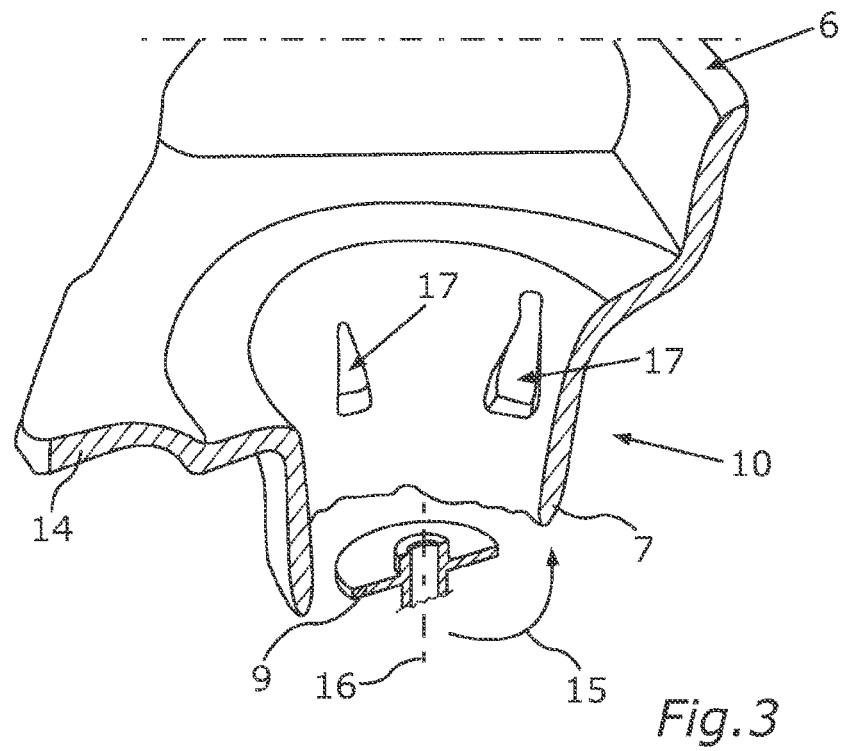
FIG. 3 shows, in the form of a detail, a schematic and sectioned perspective view of the support element in a deformed state.

The bodyshell 3 has at least one structural part, in the present case in the form of a bodyshell part 4, to which the door interior lining 2 is fastened at least indirectly, in particular directly, and on which said lining is thus held. The bodyshell part 4 is formed for example from a metallic material. Furthermore, it is conceivable that the bodyshell part is formed from at least one plastic, in particular from a fiber-reinforced plastic. The fiber-reinforced plastic can be a glass-fiber-reinforced plastic. The bodyshell part 4 can be formed as a cover which closes a through-opening in a further bodyshell part. With respect to the installed position, the door interior lining 2 is arranged on a side of the bodyshell 3 that faces the passenger compartment of the vehicle, and therefore, in the installed position, the bodyshell 3 is at least partially, in particular at least predominantly or completely, covered and thus lined by means of the door interior lining 2 toward the passenger compartment. The door interior lining 2, simply also referred to as lining or interior lining, has at least one interior lining part, also referred to as door interior lining part, in the form of an armrest 5 on which a vehicle occupant residing in the passenger compartment can support his or her arm down on in the vehicle vertical direction. Furthermore, the door interior lining 2 comprises at least one support element 6 which for example is fastened to and thus held on the bodyshell part 4 and thus on the bodyshell 3 at least indirectly, in particular directly. As will be explained in further detail below, the armrest 5 is fastened to and thus held on the support element 6 at least indirectly, in particular directly, with the result that the armrest 5 is fastened to the bodyshell part 4 and thus to the bodyshell 3 via the support element 6. Here, FIGS. 1 to 3 show a first embodiment of the support element 6, which is formed for example from a plastic and/or is formed in one piece.

Furthermore, it is conceivable that the structural part, which is formed in the present case as a bodyshell part 4, is not a structural part, therefore not a bodyshell part, of the door, but the structural part is for example a structural part of a seat unit, in particular of a vehicle seat which is formed for example as an individual seat. As a result, the armrest 5 for example is held on the seat unit. If the seat unit is for example movable in the passenger compartment, the armrest 5 is concomitantly movable with the seat unit.

As is particularly evident in combination with FIG. 2, the support element 6 has at least one fastening region 7 in which the interior lining part, in the form of the armrest 5, which can be or is fastened to the bodyshell part 4 via the support element 6 can be or is fastened to the support element 6. For this purpose, the fastening region 7 has at least one fastening element 8 by means of which the armrest 5 is fastened to the fastening region 7 and thus to the support element 6. In the first embodiment, the fastening element 8 is formed as a through-opening. In order to fasten the armrest 5 to the support element 6, which is also simply referred to as a support, use is made of a further fastening element 9 which is formed separately from the support element 6 and separately from the armrest 5. The fastening element 9 is connected to the fastening element 8 and thus fastened to the fastening region 7 or to the support element 6. By virtue of this connection of the fastening elements 8 and 9 to one another, the armrest 5 can be fastened to the support element 6. For example, the armrest 5 is screwed onto the support element 6 by means of the fastening element 9 and by means of the fastening element 8. Of course, the use of only one fastening element, in particular only one screw, is possible to fasten the armrest 5 to the support.

Alternatively or additionally, it is conceivable that the armrest 5 is latched and thus clipped with the fastening region 7 and thus with the support element 6. Furthermore, it is conceivable, instead of the fastening element 9 or of the screw, to provide a welding dome by means of which the armrest 5 is fastened to the support element 6. As will be explained in further detail below, the support element 6, by virtue of a specific shaping of the support element 6, is intended not only for fastening the armrest 5 but also for performing further functions in the event of an accident and in particular in the event of a side impact, which is also referred to as a side crash. For this purpose, the support element 6 has at least one deformation region 10 which adjoins the fastening region 7 and which is formed in meandering shape in at least one virtual or imaginary plane 11 and, in the exemplary embodiment shown, has a plurality of successive meandering loops 12. Alternatively, it is conceivable that the deformation region has at least one or exactly one meandering loop 12.

It can be seen from FIG. 2 that the support element 6 is formed in the deformation region 10 in the manner of a dome or a bellows, wherein the deformation region 10 can be formed symmetrically, in particular rotationally symmetrically, or else asymmetrically or non-rotationally symmetrically. There thus exists an infinite number of planes in which the deformation region 10 is formed in a meandering shape, wherein, in the installed position, all these planes run obliquely or preferably parallel to the vehicle transverse direction and here obliquely or preferably parallel to a fastening direction which, in FIG. 2, runs through an arrow 13 and in which the armrest 5 is fastened to the fastening region 7 and thus to the support element 6, or the fastening direction runs in the respective plane. In the installed position, the fastening direction preferably coincides with the vehicle transverse direction. By virtue of this meandering configuration of the deformation region 10, the latter, under the application of an accident-induced force running at least in the plane 11, can be deformed under absorption of a particularly high amount of accident energy, with the result that for example excessive loading and thus resulting deformations, fractures, cracks and sharp edges of the armrest 5 or of the door interior lining 2 overall can be avoided.

In particular, the meandering deformation region 10 is arranged in such a way that its orientation is adapted to a simulatively determined loading direction, in particular in such a way that the loading direction runs parallel to or in the plane in which the deformation region runs in a meandering shape. As a result, the deformation region 10 can be particularly advantageously deformed and thus absorb a particularly large amount of accident energy.

For example, in the event of a side impact, an accident-induced application of force acts in the vehicle transverse direction from the outside in on the side door, with the result that the application of force acts via the bodyshell 3 on the support element 6 and possibly via the latter on the armrest 5. Since the deformation region 10 is here arranged between the bodyshell 3 and the armrest 5, the deformation region 10 is deformed by the accident-induced application of force. As a result, the deformation region 10 takes up at least a fraction of the application of force and keeps this fraction away from the armrest 5. In other words, the support element 6 has in its deformation region 10 such a wavy geometry that allows a defined deformation under loading in the event of a side impact. This deformation, which results from a side impact, of the deformation region 10 or of the support element 6 overall can be seen from a combination of FIGS. 2 and 3. FIG. 2 shows the support element 6 in a nondeformed state, whereas FIG. 3 shows the support element 6 in a deformed state. In the nondeformed state, the fastening region 7 is arranged for example on a first side of the support element 6. By virtue of an accident-induced application of force on the support element 6 that results from a side impact, the deformation region 10 is deformed in such a way that the meandering configuration is canceled. In other words, the meandering loops 12 are as it were pulled apart, with the result that the fastening region 7 turns inside out and passes from the first side to an opposite second side. The deformation region 10 thus acts as an energy absorption element or as a deformation element which is preferably designed in such a way that a failure precisely does not occur. This means that, although the support element 6 is deformed, in particular plastically, a failure of the support element 6 does not take place. As a result, a particularly high amount of accident energy can be taken up and absorbed.

The support element 6 in conjunction with the armrest 5 is distinguished by the fact that the interior lining part (armrest 5), also referred to as an inner lining part, can deform or move in the direction of the passenger compartment in a controlled manner. As a result, an excessive deflection of the armrest 5 can be avoided. Consequently, a particularly low fracture risk of the armrest 5 can also be realized. By contrast with prior solutions in which for example an arrester strap or pins is or are used, the fastening arrangement 1 affords the advantage that accident energy can be absorbed or dissipated by deformation of the deformation region 10. Here, the deformation region 10 acting as a deformation element is an element, in particular deformation element, integrated into the support element 6, with the result that the support element 6 can absorb accident energy. Consequently, the armrest 5 does not have to take up and absorb any accident-induced energy or only a small amount of accident energy, with the result that undesired deformations and forms of failure of the armrest 5 can be avoided. Since the deformation region 10 is a constituent part of the support element 6, the above-described and here advantageous accident behavior can be implemented in a particularly cost-effective manner. In particular, the support element 6 overall can be produced in a particularly cost-effective manner. Here, for example, the fastening region 7 is formed in one piece with the deformation region 10.

Moreover, the support element 6 has for example a base region 14 which adjoins the deformation region and via which for example the support element 6 is fastened to the bodyshell part 4. It is preferably also the case here that the base region 14 is formed in one piece with the deformation region 10, with the result that the support element 6 can be produced in a simple and cost-effective manner.

As can be seen from FIGS. 2 and 3, the deformation region 10 has through-openings 17 along its circumferential direction or boundary line which is illustrated in FIG. 3 by an arrow 15 and which for example runs about an imaginary axis 16 which runs parallel to or in the plane 11 and which for example coincides with the fastening direction, said through-openings preferably being arranged in a uniformly or nonuniformly distributed manner in the circumferential direction of the deformation region 10.

Alternatively or additionally, it is conceivable that the deformation region 10, in particular its meandering loops 12, has/have at least two camberings and/or curvatures 25 (shown in FIG. 2) and/or wall thicknesses which are different from one another. As a result, the deformation behavior and thus accident behavior can be set in a targeted manner. In addition, there is provision in the present case that the support element 6 and thus the fastening region 7, the deformation region 10 and the base region 14 are formed from a plastic. The support element 6 can be formed or produced in one piece and/or undercut-free and/or slide-free, with the result that it can be produced in a particularly cost-effective manner. In particular, the support element 6 can be demolded in a particularly simple manner from a mold by means of which the support element is produced for example by injection-molding, in particular along a main demolding direction.

Figure 4:
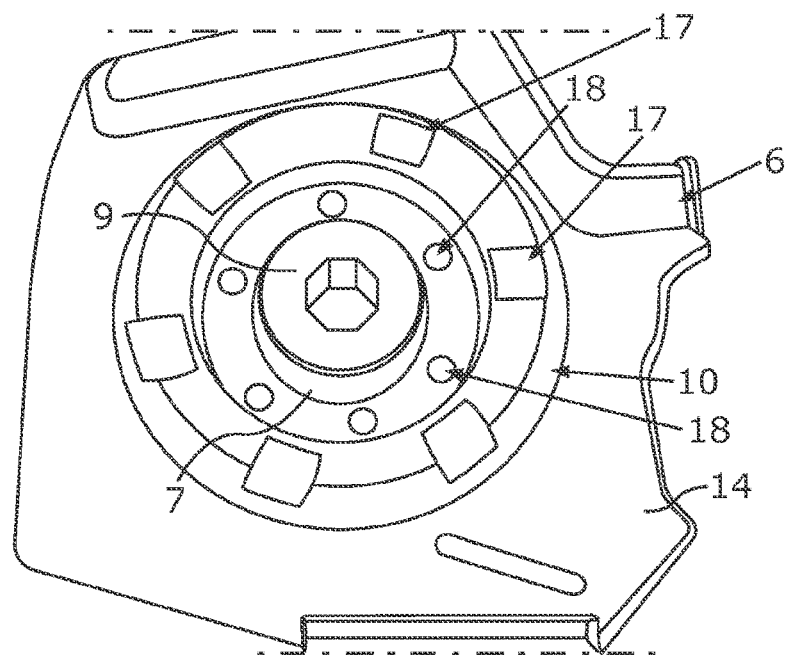
FIG. 4 shows, in the form of a detail, a schematic and perspective plan view of the support element according to a second embodiment.

The support element 6, in particular the deformation region 10 acting as a deformation element, can be embodied in different variants. Here, FIG. 4 shows a second embodiment. The second embodiment differs from the first embodiment in particular in the number of through-openings 17 and 18 of the deformation region 10. It can be seen from FIG. 4 that the deformation region 10 in the second embodiment has not only the through-openings 17 but further through-openings 18 which are arranged so as to be uniformly or nonuniformly distributed in the circumferential direction of the deformation region 10. In particular, the through-openings 18 are arranged with an offset to the through-openings 17 in the circumferential direction of the deformation region 10. In addition, the through-openings 17 are offset in terms of height with respect to the through-openings 18 along the axis 16 and are thus arranged at different heights. The through-openings 17 and 18 are cutouts.

The deformation region 10, in particular the support element 6, can be formed symmetrically, in particular rotationally symmetrically. Furthermore, it is conceivable that at least the deformation region 10 is formed asymmetrically, in particular non-rotationally symmetrically.

Figure 5:
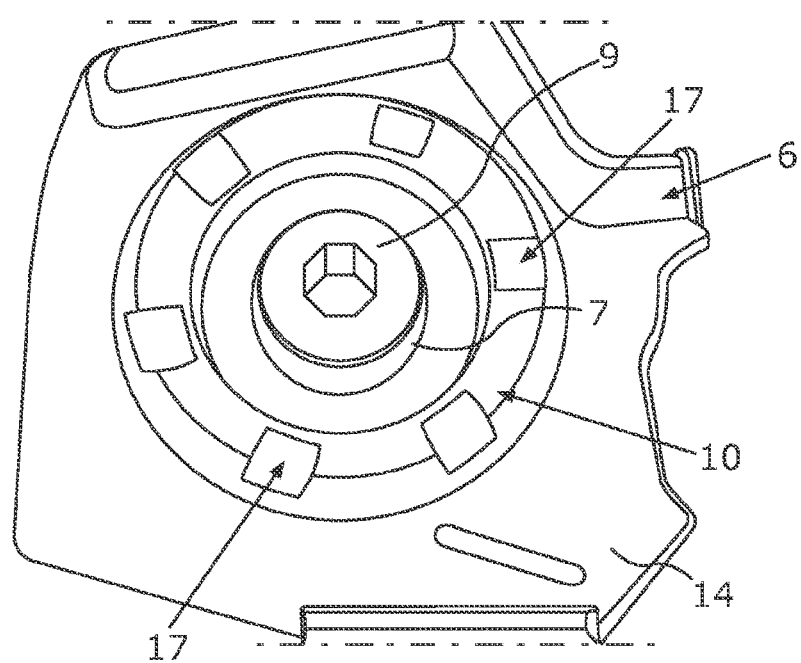
FIG. 5 shows, in the form of a detail, a schematic and perspective plan view of the support element according to a third embodiment.

FIG. 5 shows a third embodiment which differs for example from the first embodiment and/or second embodiment in the number of through-openings and/or in terms of the wall thickness. In particular, it can be seen that the embodiments can differ from one another in their geometry, in particular in their cross-sectional thicknesses, in the number of their cutouts, in their camberings and/or in other parameters. In particular, it is conceivable that the deformation region 10 can be embodied with or without cutouts. The respective geometric configuration of the deformation region 10 can be effected specifically for any desired materials customarily used in interior structural parts and ultimately take into consideration the accident-dependently desired force-distance profile.

Figure 6:
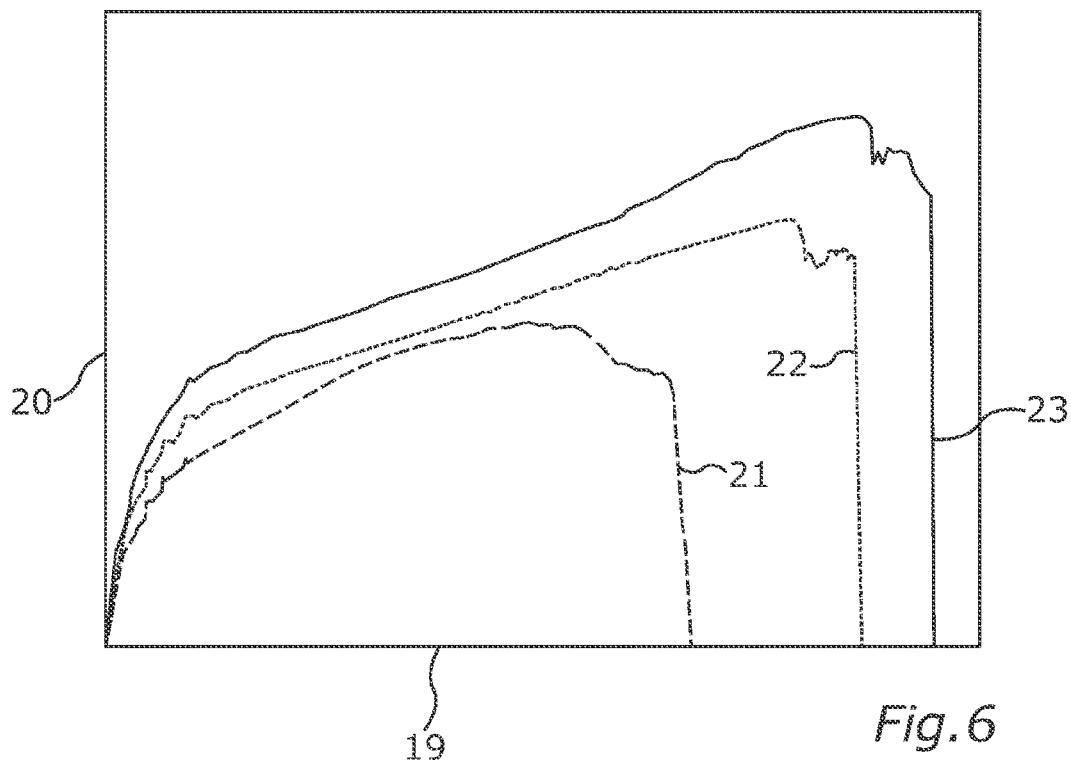
FIG. 6 shows a diagram for illustrating deformation and thus accident behaviors of the support element according to the different embodiments.

FIG. 6 shows a diagram on whose abscissa 19 a distance is plotted. On the ordinate 20 there is plotted a force. The distance plotted on the abscissa 19 is for example the distance by which the deformation region 10 is deformed. In particular, the distance is for example a distance which is covered by the fastening region 7 during the deformation of the deformation region 10. The force plotted on the ordinate 20 is for example a force which, in the event of an accident, in particular in the event of a side impact, acts on the deformation region 10, in particular via the fastening region 7. A profile 21 which is plotted in the diagram which is shown in FIG. 6 illustrates for example the deformation behavior and in this case the force-distance profile of the support element 6 of the second embodiment, and a profile 22 shows the deformation or the force-distance profile of the third embodiment. Furthermore, a profile 23 illustrates for example the deformation behavior or accident behavior and thus the force-distance profile of the support element 6 according to the first embodiment.

It has been shown to be particularly advantageous if the respective support element 6, in particular its geometry, is free of undercuts. This means that the support element 6 and thus in particular the deformation region 10 has no undercuts. As a result, the support element 6 can be produced in a particularly simple manner by means of a mold, since the support element 6 can for example be demolded along customary demolding directions after production thereof, that is to say can be released from the mold or removed from the mold. In particular, it is conceivable that the support element 6 is produced by injection-molding. Since the support element has no undercuts, the support element 6 can be demolded in a simple manner after the injection-molding and removed from the mold in the form of an injection mold. Consequently, the support element 6 can be produced without adding additional structural parts or production steps, with the result that the advantageous accident behavior can be realized in a cost-effective manner. By correspondingly selecting the geometry or the material from which the support element 6 is produced, its force-distance profile and stress-strain behavior in particular under highly dynamic loading can be set in a targeted manner, with the result that a particularly advantageous accident behavior can be realized.

LIST OF REFERENCE SIGNS

1 Fastening arrangement
2 Door interior lining
3 Bodyshell
4 Bodyshell part
5 Armrest
6 Support element
7 Fastening region
8 Fastening element
9 Further fastening element
10 Deformation region
11 Plane
12 Meandering loops
13 Arrow
14 Base region
15 Arrow
16 Axis
17 Through-opening
18 Through-opening
19 Abscissa
20 Ordinate
21 Profile
22 Profile
23 Profile

What is claimed is:

1. A component for fastening an interior lining part to a structural part of a vehicle, comprising:
   a support element, wherein the interior lining part is fastenable to the structural part via the support element, wherein
   the support element has a fastening region with a surface that extends perpendicular to a fastening direction, the fastening direction being a direction in which the interior lining part is fastenable to the structural part,
   the support element has at least one deformation region extending from the fastening direction and having a meandering shape and is deformable under application of a force, wherein the meandering shape includes a serpentine cross-section in a plane, the plane being parallel to the fastening direction and perpendicular to the surface of the fastening region, wherein
   the at least one deformation region extends circumferentially about an imaginary axis such that the imaginary axis is located in the center of the deformation region, the imaginary axis being within or parallel to the plane, and wherein
   the meandering shape includes at least one through-opening configured to set an energy absorption capacity of the deformation region in a targeted manner, the through-opening being spaced radially from the imaginary axis such that the imaginary axis does not intersect the through-opening.

2. The component according to claim 1, wherein the fastening direction runs in the plane.

3. The component according to claim 1, wherein in an installed position of the support element, the deformation region:
   i) runs in meandering shape in at least one of a vehicle longitudinal direction and in a vehicle vertical direction, or
   (ii) in at least one of a vehicle transverse direction and in the vehicle vertical direction.

4. The component according to claim 1, wherein the deformation region has a plurality of through-openings that are arranged circumferentially around the imaginary axis.

5. The component according to claim 4, wherein at least one through-opening of the plurality of through-openings is formed as a slot.

6. The component according to claim 1, wherein the deformation region has at least two different camberings and/or curvatures.

7. The component according to claim 1, wherein the deformation region has at least two different wall thicknesses.

8. The component according to claim 1, wherein at least the deformation region is formed from a plastic.

9. The component according to claim 1, wherein the deformation region is formed symmetrically.

10. The component according to claim 1, wherein the deformation region is formed asymmetrically.

11. A fastening arrangement, comprising:
    a support element; and
    an interior lining part which is fastenable to a structural part of a vehicle via the support element, wherein
    the support element has at least one deformation region which is deformable under application of a force, wherein
    the at least one deformation region extends in a circumferential direction about an imaginary axis through a center of the deformation region and includes a meandering shape with channels encircling the imaginary axis, wherein
    the imaginary axis extends through an opening of the at least one deformation region and extends in a fastening direction of the support element, and wherein
    the deformation region includes a plurality of through-openings arranged circumferentially about the imaginary axis, the through-openings each being spaced radially from the imaginary axis such that the imaginary axis does not intersect the through-openings.

12. The fastening arrangement according to claim 11, wherein
    the support element is formed separately from the structural part and is fastened to the structural part.

13. A vehicle, comprising:
    a structural part of the vehicle; and
    at least one fastening arrangement comprising:
       a support element; and
       an interior lining part which is fastened to the structural part of the vehicle via the support element, wherein
       the support element has at least one deformation region which is formed in meandering shape in a plane and is deformable under application of a force, wherein
    the at least one deformation region extends in a circumferential direction about an imaginary axis running parallel to or in the plane, wherein
    wherein the imaginary axis extends through a central opening of the at least one deformation region and extends in a fastening direction of the support element, and wherein
    the deformation region includes a plurality of through-openings arranged circumferentially about the imaginary axis, each of the through-openings being spaced radially from the imaginary axis such that the imaginary axis does not intersect the through-openings.

* * * * *